US009528894B2

(12) United States Patent
Espinosa Sanchez

(10) Patent No.: US 9,528,894 B2
(45) Date of Patent: Dec. 27, 2016

(54) SYSTEM FOR REMOTELY MEASURING PRESSURE

(71) Applicant: AIRBUS MILITARY, Getafe (ES)

(72) Inventor: Martin Espinosa Sanchez, Getafe (ES)

(73) Assignee: AIRBUS Military, Madrid (ES)

( * ) Notice: Subject to any disclaimer, the term of this patent is extended or adjusted under 35 U.S.C. 154(b) by 141 days.

(21) Appl. No.: 14/581,718

(22) Filed: Dec. 23, 2014

(65) Prior Publication Data

US 2015/0185098 A1    Jul. 2, 2015

(30) Foreign Application Priority Data

Dec. 27, 2013  (EP) ..................... 13382566

(51) Int. Cl.
| | |
|---|---|
| *G01L 9/00* | (2006.01) |
| *G01L 19/00* | (2006.01) |
| *G01L 19/06* | (2006.01) |
| *B64D 37/00* | (2006.01) |
| *B64D 37/04* | (2006.01) |
| *G01L 19/08* | (2006.01) |

(52) U.S. Cl.
CPC .......... *G01L 9/0041* (2013.01); *B64D 37/005* (2013.01); *B64D 37/04* (2013.01); *G01L 19/0007* (2013.01); *G01L 19/0645* (2013.01); *G01L 19/086* (2013.01)

(58) Field of Classification Search
None
See application file for complete search history.

(56) References Cited

U.S. PATENT DOCUMENTS

| | | | |
|---|---|---|---|
| 4,425,800 A | | 1/1984 | Claassen et al. |
| 5,918,265 A | * | 6/1999 | Oertel .................. G10K 15/043 73/12.08 |
| 2005/0225035 A1 | | 10/2005 | Sundet |
| 2007/0272027 A1 | | 11/2007 | Hedtke |

(Continued)

FOREIGN PATENT DOCUMENTS

| | | |
|---|---|---|
| DE | 19813756 | 10/1999 |
| DE | 10200779 | 7/2003 |
| WO | WO-9627124 | 9/1996 |

OTHER PUBLICATIONS

Extended European Search Report for Application No. 13382566 dated Feb. 7, 2014.

(Continued)

*Primary Examiner* — Andre Allen
(74) *Attorney, Agent, or Firm* — Jenkins, Wilson, Taylor & Hunt, P.A.

(57) ABSTRACT

System for remotely measuring pressure for pressures exerted by a fluid conveyed by a pipe, the system comprising a measuring tube with a first end connected to the pipe and a second end to a pressure sensing element. The measuring tube completely filled with a liquid and comprising water-tight membranes that respectively close its both ends retaining the liquid inside it, a first membrane in contact with the fluid and closing its first end, and a second membrane in contact with the pressure sensing element and closing its second end. The first membrane being sensitive to fluid pressure oscillations and the second membrane o liquid pressure oscillations for propagating the pressure exerted by the fluid to the pressure sensing element for its measure.

13 Claims, 2 Drawing Sheets

(56) References Cited

U.S. PATENT DOCUMENTS

2008/0098818 A1* 5/2008 Fernald ............ G01F 1/7082
  73/622
2009/0025487 A1* 1/2009 Gysling ............ G01F 1/662
  73/861.25

OTHER PUBLICATIONS

Kari T. Koskinen et al., "Handbook of Hydraulic Fluid Technology—Chapter 13: Water Hydraulics", In: "Handbook of Hydraulic Fluid Technology—Chapter 13: Water Hydraulics", Oct. 15, 1999, CRC Press, XP055101026, ISBN: 0824760220, pp. 679-679.

* cited by examiner

SYSTEM FOR REMOTELY MEASURING PRESSURE

CROSS-REFERENCE TO RELATED APPLICATION

This application claims the benefit of and priority to European Patent Application No. 13382566.1 filed on Dec. 27, 2013, the entire disclosure of which is incorporated by reference herein.

TECHNICAL FIELD

The subject matter disclosed herein refers to a system for remotely measuring pressure, specifically for pressures exerted by a fluid conveyed by a pipe, and especially for those pipes which cannot be directly measured.

BACKGROUND

There are known different systems for measuring internal pressures in pipe systems. U.S. Pat. No. 4,425,800A discloses a device for ascertaining the internal pressure in a pressure system, particularly in a fuel injection pipe system, wherein the pressure to be measured is contained within an element which includes at one point a wall portion of reduced thickness so as to act like a membrane, and wherein a sensor device is included which is positionable in engagement with the membrane-like wall portion to detect any elastic deformation and variation of the membrane caused by the influence of the internal pressure.

So, by U.S. Pat. No. 4,425,800A the use of sensors located at points of the pipe that have the potential to suffer a deformation by the fluid contained in the pipe is already known. However, reducing the thickness of the wall of the pipe entails certain skill and could give rise to problems, going from measuring problems to leaking problems, depending on how much the thickness is reduced. Also, such reference does not address remote measurements with electrical current generation limitation.

German patent application DE19813756A discloses a method for measuring the pressure of a fluid. The fluid is applied to a measuring object so that the pressure of the fluid deflects a mechanical pick-up measuring element, which is part of the measuring object. The movements of the pick-up element are of a membrane type and its deflection is measured using at least one sensor placed at the furthest side from the fluid. The pick-up element is formed by at least one blind hole perpendicular to the side of the measuring object nearest to the fluid. The Application does not solve the air trapping problem and, again, the Application does not address remote measurements with current limitation.

In aeronautical field also exists the need of measuring the pressure exerted by a fluid within a pipe. Specially, this need arise for the fuel pipes of the aircraft fuel tanks, since monitoring the pressure of the fuel is an essential issue for aircraft testing operations.

International airworthiness regulations are very restrictive regarding the installation of electrical devices within aircraft fuel tanks, since the electrical current in the fuel tank of the aircraft is limited. Therefore, in order to comply with the international airworthiness regulations, the fuel pipes inner pressures must be remotely measured.

FIG. 1 shows a schematic representation of a prior art aircraft fuel installation wherein a fuel pipe 17 crosses the installation and runs within an aircraft fuel tank compartment 16. Due to the electrical current restriction, the fuel pipe 17 pressure is measured outside the aircraft fuel tank compartment 16 by a sensor 20 connected to the fuel pipe 17 via a small diameter pipe 18. The small diameter pipe 18 is connected, at one side, to the fuel pipe 17 and, at the other side, to the sensor 20 and is responsible for measuring the inner pressure of the fuel pipe 17. The small diameter pipe 18 achieves measuring the fuel pipe 17 pressure at the point 19 where the pressure has to be measured, and helps to comply with the electrical current limitation allowing placing the sensor 20 out of the aircraft fuel tank compartment 16. This sensor 20 is usually placed on the compartment wall.

However, in many cases, the point to be measured is at a long distance from the closest compartment wall, so that the small diameter pipe has to cover a large route. In these cases, the fuel installation becomes complicated, especially when the route runs close to some accesses, which have to be cleared, or close to some hardware that has to be avoided.

Additional drawbacks may come up if the small diameter pipe has a route with high points or if the fuel pipe is not well primed, in these cases, the small diameter pipe might trap air. Trapped air within the small diameter pipe disturbs the pressure measurement, since it operates as a sensing pipe. These disturbances are more significant during transients, making measurements completely invalid.

Therefore, it has been detected in this technical filed the need for a system for remotely measuring pressure that provides a reliable measure of pressure and that avoids trapping air. Additionally, it has been detected that this system is especially needed in the aeronautical industry in order to fulfill with the international airworthiness regulations and perform remote measurements of the pressure of the fuel pipes that run within the aircraft fuel tank compartments.

SUMMARY

The subject matter disclosed herein overcomes the drawbacks above mentioned by providing a system for remotely measuring pressure that provides a reliable measure of pressure without trapping air. Additionally, the system complies with the international airworthiness regulations regarding the electrical current limitation within the aircraft fuel tank compartments, ensuring a proper remote measuring of pressure of fuel pipes whatever be the route followed by the fuel pipes.

An aspect of the subject matter disclosed herein refers to a system for remotely measuring pressure for pressures exerted by a fluid conveyed by a pipe, the system comprising a measuring tube with a first end connected to the pipe and a second end connected to a pressure sensing element wherein, the measuring tube is completely filled with a liquid,
the measuring tube comprising watertight membranes that respectively close its both ends retaining the liquid inside the measuring tube,
a first membrane in contact with the fluid and closing the measuring tube first end, and a second membrane in contact with pressure sensing element and closing the measuring tube second end,
wherein the first membrane is sensitive to fluid pressure oscillations and the second membrane is sensitive to liquid pressure oscillations for propagating the pressure exerted by the fluid to the pressure sensing element for its measure.

In this way, the subject matter disclosed herein provides a system that performs a reliable measure of pressure that does not trap air. As mentioned, the subject matter disclosed herein comprises a measuring tube completely filled with liquid, wherein the measuring tube is closed at its both ends by watertight membranes that retain the liquid inside thereof. Thus, since the membranes do not allow the pass of fluid into the measuring tube or the pass of the liquid into the pipe, the measuring tube cannot trap air neither from the fluid nor form the liquid. Likewise, the membranes do not allow the pass of gasses, so the measuring tube neither can trap air from its environment. Thus, the subject matter disclosed herein solves the typical trapped air problem in the measuring tube by filling the measuring tube entirely and sealing their both ends with impermeable membranes, such that no liquid or gas can pass through them. In fact, by filling the measuring tube entirely, the subject matter disclosed herein further ensures that the measuring tube has no air inside it from the beginning. For this, the measuring tube has to be initially filled with the liquid and primed to eliminate the possible air trapped before sealing its ends with the membranes.

Additionally, since the subject matter disclosed herein provides a system wherein the measuring tube does not contain any air, the subject matter disclosed herein provides a reliable measure of pressure, since the air contained inside the measuring tube disturbs pressure measurements. In addition, in order to allow the remote measure of pressure by the propagation of pressure oscillations, the measuring tube is closed by two membranes, wherein each membrane is sensitive to the pressure oscillations of the liquid that propagates the pressure oscillations of the fluid to be measured. In this way, the membranes allow the propagation by providing a reliable way of obtaining a remote measure.

Additionally, the system for remotely measuring pressure is suitable for being used in pipes employed in aircrafts fuel installations, and especially, for those pipes which extend along aircraft fuel tank compartments, since those pipes have to be remotely measured. The need for a remote measure arises from the electrical current limitation within aircraft fuel tanks imposed by international airworthiness regulations. Due to this limitation, those pipes running along aircraft fuel tank compartments cannot be directly connected to any sensor or electrical device due to the risk of ignition thereof. Thus, the subject matter disclosed herein provides a system for remotely measuring that, therefore, is directly applicable to aircraft fuel tank compartments.

One object of the subject matter disclosed herein is to provide a system that is able to obtain a reliable remote measure of pressure under any measuring condition, and particularly, under any route followed by the pipe that conveys the fluid to measure.

Another object of the subject matter disclosed herein is to provide a system for remotely measuring pressure whose measuring element does not trap air in its connection with the pipe that conveys the fluid to measure. Another object of the subject matter disclosed herein is to provide a system suitable for being used in aircraft fuel tanks to remotely measure the pressure of the fuel pipes that run within the tanks.

Another object of the subject matter disclosed herein is to provide a system that fulfils with international airworthiness regulations in relation with the electrical current limitation within aircraft fuel tanks.

BRIEF DESCRIPTION OF THE DRAWINGS

For a better comprehension of the subject matter disclosed herein the following drawings are provided for illustrative and non limiting purposes, wherein.

DETAILED DESCRIPTION

Figure 1:
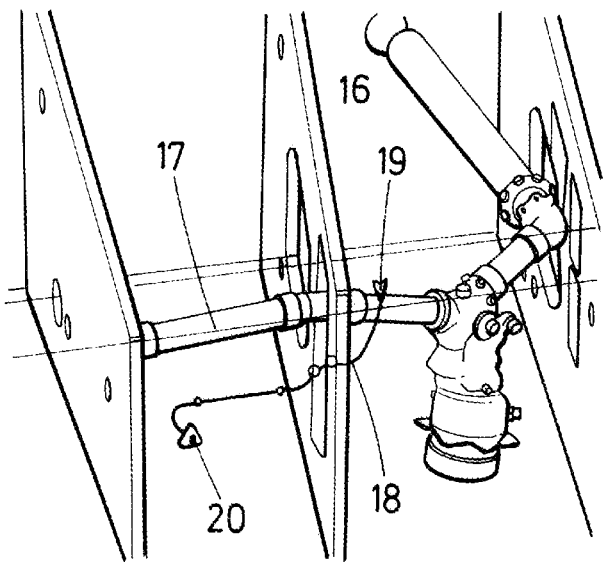
FIG. 1 shows a schematic representation of a prior art aircraft fuel installation.
Figure 2:
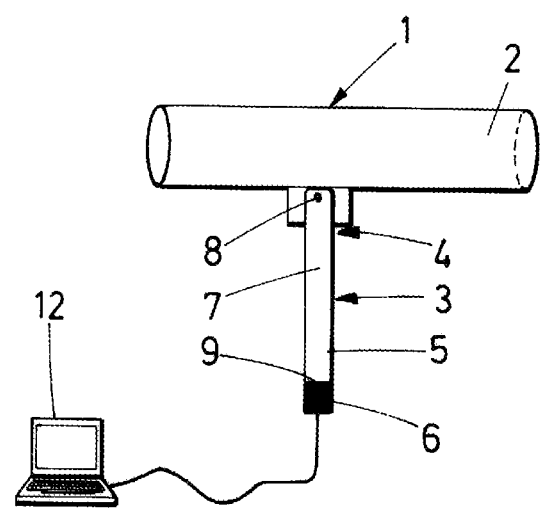
FIG. 2 shows a schematic view of the system for remotely measuring pressure according to a preferred embodiment.

FIG. 2 shows an exemplary embodiment of a system for remotely measuring pressure. The system of the figure comprises the pipe 1 that conveys the fluid 2 to measure, the measuring tube 3 entirely filled with the liquid 7 and connected to the pipe 1 by one of its ends, the pressure sensing element 6 connected to the measuring tube 3 for providing an electrical signal proportional to the pressure to be measured, and the signal processing device 12 configured to calculate the measured pressure. The measuring tube 3 is connected, by its first end 4, to the pipe 1 and by its second end 5, to the pressure sensing element 6. Additionally, the measuring tube 3 comprises watertight membranes 8, 9, that seal the both ends 4, 5 of the measuring tube 3, retaining the liquid 7 inside thereof. The watertight membranes could also be referred as being impermeable membranes, since the membranes do not allow that gases or liquids passes through them, neither the fluid 2 nor the liquid 7.

Filling completely the measuring tube 3 with the liquid 7 and providing at its both ends 4, 5 membranes 8, 9 sensitive to pressure oscillations, the system ensures providing a proper remote measuring of pressure. For this, the first membrane 8 has to be sensitive to fluid 2 pressure oscillations and the second membrane 9 to liquid 7 pressure oscillations, since the propagation of pressure occurs from the fluid 2 conveyed by the pipe 1 to the farthest end of the measuring tube 3, namely, the second end 9.

Preferentially, the liquid 7 contained in the measuring tube 3 has a Bulk modulus higher than 1000 MPa, in such a way that liquids with modulus higher than 1000 MPa achieve good propagation for pressure oscillations. In a preferred embodiment, an incompressible liquid is desired, since the percentage of compressibility of the liquid has a percentage of error associated with relation to the pressure measured.

Preferentially, the liquid is compatible with the environment in which the subject matter disclosed herein is applied, so that any breakages or leaks pose no environmental pollution. In another preferred embodiment, the liquid may be a gel.

In this way, the fluid 7 performs a better propagation, since the fluid pressure oscillations suffer lower disturbances in their propagation. Therefore, an accurate pressure measurement is achieved.

In a preferred embodiment, the pressure sensing element 6 is configured to measure the second membrane 9 deformation and provide an electrical signal proportional to the measure.

In another preferred embodiment, the signal processing device 12 is in communication with the pressure sensing element 6, and the signal processing device 12 is configured to calculate a pressure relative to the electrical signal provided by the pressure sensing element 6. In addition, according to achieve a better propagation for the pressure oscillations, according to another preferred embodiment, the measuring tube 3 may comprise rigid materials such as titanium, aluminum or aluminium alloys, especially for aviation applications. Providing these materials, the system ensures that the walls of the measuring tube 3 will not be deformed during the propagation of the pressure signals. Such deformation could interfere with the propagation of pressure oscillations or decrease amplitudes thereof, complicating the measuring. Therefore, providing measuring tubes 3 that comprise titanium or aluminum alloys, the subject matter disclosed herein further ensures the reliability of the measurement. Likewise, in order to achieve a better propagation for the pressure oscillations, the first membrane 8 and the second membrane 9 may be made of different material, according to another preferred embodiment. Preferentially, the first membrane 8 is made of a suitable type of rubber, such as Nitrile Butadiene Rubber (NBR) or fluorosilicone, depending on the application, and, preferentially, the second membrane 9 is made of a ceramic material or polysilicon. Providing different materials for the membranes, the system avoids potential resonances effects. Thus, the subject matter disclosed herein further ensures the reliability of the measurement.

Figure 3:
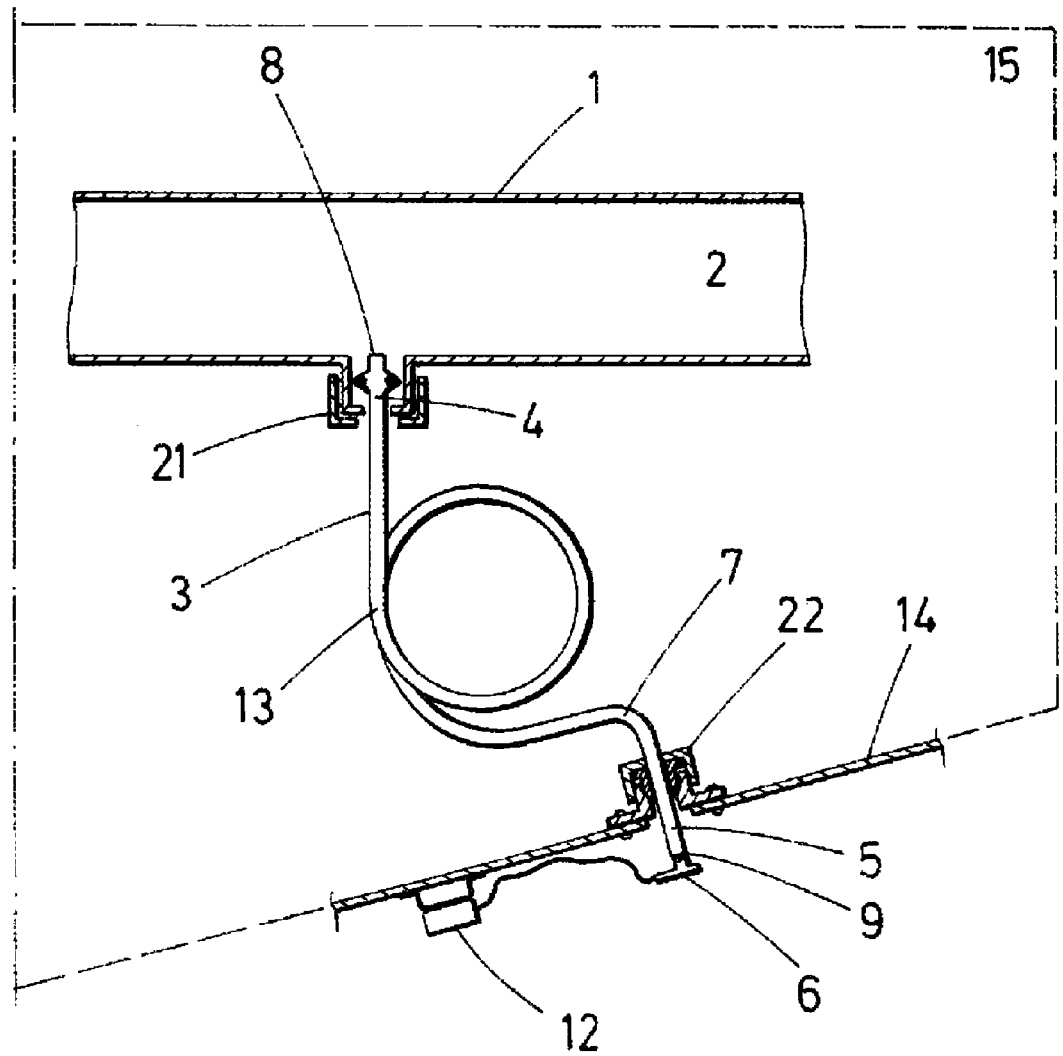
FIG. 3 shows a schematic detail view of the system of the subject matter disclosed herein contained in an aircraft fuel tank compartment, according to another preferred embodiment.

FIG. 3 shows a detail view of the system of the subject matter disclosed herein placed in an aircraft fuel tank compartment. The figure shows an aircraft fuel tank contained in a compartment 15 closed by a wall 14, wherein the aircraft fuel tank comprises the system of the subject matter disclosed herein. As shown, the second membrane 9 of the measuring tube 3 is outside the wall 14 of the compartment 15. In this way, the subject matter disclosed herein fulfils with the international airworthiness regulations, since as being the second membrane 9 outside the wall 14, the current limitation within the aircraft fuel tank compartment is achieved. Placing the second membrane 9 outside, the pressure sensing element 6 will be also placed outside the compartment 15.

According to a preferred embodiment, the fluid 2 conveyed by the pipe 1 is fuel. And according to another preferred embodiment, the liquid 7 of the measuring tube 3 is a non-inflammable fuel emulator. Likewise, any other compatible liquid or gel can be used for the measuring tube 3. Thus, using a fuel emulator as sensing liquid in the measuring tube 3 to measure the pressure of the fuel contained in the pipe 1, the system obtains an accurately measure of pressure.

In a preferred embodiment, the measuring tube 3 may comprise a part configured with at least one loop 13 to provide an adaptable connection with the pipe 1. As shown in FIG. 3, the measuring tube 3 comprises a pigtail geometry providing an adaptable connection between the port at the pipe 1 and the interface of the fuel tank compartment 15. As show, at the first end 4, the measuring tube 3 is fitted to the pipe 1, at the point where the pressure has to be monitored, so as the first membrane 8 is in contact with the fluid 2 of pipe 1. For that, the system provides a special fitting to ensure the sealing of the pipe 1 around the hole requested to measure the pressure by the first membrane 8. Preferably, this special fitting comprises a flexible joint 21 to be tapped on the pipe 1.

As additionally shown in FIG. 3, the second end 5 of the measuring tube 3 crosses through the wall 14 of the aircraft fuel tank compartment 15. In this crossing, the system provides a flaredless connection 22 to a bulkhead riveted on the wall 14.

As additionally shown, at the second end 5 of the measuring tube 3, the second membrane 9 is flush with the pressure sensing element 6. The pressure sensing element 6 measures the second membrane 9 deformation to provide an electrical signal proportional to the deformation measured. This electrical signal is sent to the signal processing device 12 that is configured to calculate a pressure relative to the electrical signal provided by the pressure sensing element 6. Preferentially, the pressure sensing element 6 comprises a load cell or a pressure sensor.

The measuring tube may have different geometries according to the particular geometry requested for every application. In any case, the measuring tube ensures a proper function under any operational circumstances.

The invention claimed is:

1. A system for remotely measuring pressure exerted by a fluid conveyed by a pipe, the system comprising a measuring tube with a first end connected to the pipe and a second end connected to a pressure sensing element, and wherein:
   the measuring tube is completely filled with a liquid,
   the measuring tube comprises watertight membranes that respectively close its both ends retaining the liquid inside the measuring tube,
   a first membrane is in contact with the fluid and closes the measuring tube first end, and a second membrane is in contact with the pressure sensing element and closes the measuring tube second end,
   the first membrane is sensitive to fluid pressure oscillations and the second membrane is sensitive to liquid pressure oscillations for propagating the pressure exerted by the fluid to the pressure sensing element for its measure.

2. The system according to claim 1, wherein the liquid of the measuring tube has a Bulk modulus higher than 1000 MPa.

3. The system according to claim 1, wherein the pressure sensing element is configured to measure a deformation of the second membrane and to provide an electrical signal proportional to the measured deformation.

4. The system according to claim 3, wherein the system further comprises a signal processing device in communication with the pressure sensing element, the signal processing device configured to calculate a pressure relative to the electrical signal provided by the pressure sensing element.

5. The system according to claim 1, wherein the pressure sensing element comprises a load cell or a pressure sensor.

6. The system according to claim 1, wherein the measuring tube comprises a part configured with at least one loop to provide an adaptable connection with the pipe.

7. The system according to claim 1, wherein the measuring tube comprises titanium or aluminum.

8. The system according to claim 1, wherein the first membrane and the second membrane are made of different material.

9. The system according to claim 1, wherein the first membrane is made of Nitrile Butadiene Rubber (NBR) or of fluorosilicone.

10. The system according to claim 1, wherein the second membrane is made of a ceramic material or polysilicon.

11. An aircraft fuel tank contained in a compartment closed by a wall, the aircraft fuel tank comprising the system for remotely measuring pressure according to claim 1, wherein the second membrane of the measuring tube is outside the wall.

12. The aircraft fuel tank according to claim 11, wherein the fluid conveyed by the pipe is fuel.

13. The aircraft fuel tank according to claim 11, wherein the liquid of the measuring tube is a non-inflammable fuel emulator.

* * * * *